United States Patent
Ohkubo et al.

(10) Patent No.: US 10,846,164 B2
(45) Date of Patent: Nov. 24, 2020

(54) SYSTEM LSI AND FAULT DETECTION METHOD FOR SYSTEM LSI

(71) Applicants: KABUSHIKI KAISHA TOSHIBA, Minato-ku (JP); TOSHIBA ELECTRONIC DEVICES & STORAGE CORPORATION, Minato-ku (JP)

(72) Inventors: Naoaki Ohkubo, Yokohama (JP); Jun Tanabe, Yokohama (JP)

(73) Assignees: KABUSHIKI KAISHA TOSHIBA, Minato-ku (JP); TOSHIBA ELECTRONIC DEVICES & STORAGE CORPORATION, Minato-ku (JP)

(*) Notice: Subject to any disclaimer, the term of this patent is extended or adjusted under 35 U.S.C. 154(b) by 231 days.

(21) Appl. No.: 15/913,449

(22) Filed: Mar. 6, 2018

(65) Prior Publication Data
US 2019/0087254 A1  Mar. 21, 2019

(30) Foreign Application Priority Data
Sep. 15, 2017  (JP) .................................. 2017-178232

(51) Int. Cl.
*G06F 11/07*  (2006.01)
*G06F 12/084*  (2016.01)
(Continued)

(52) U.S. Cl.
CPC .......... *G06F 11/079* (2013.01); *G06F 11/073* (2013.01); *G06F 11/0751* (2013.01);
(Continued)

(58) Field of Classification Search
CPC ............................... G06F 11/07; G06F 11/079
(Continued)

(56) References Cited

U.S. PATENT DOCUMENTS 5,522,058 A * 5/1996 Iwasa .................. G06F 12/0813
                                                              711/121
5,585,750 A * 12/1996 Noguchi .................. G06F 1/08
                                                              327/113
(Continued)

FOREIGN PATENT DOCUMENTS

JP  H08-44629 A   2/1996
JP  08-320827    12/1996
(Continued)

*Primary Examiner* — Kamini B Patel
(74) *Attorney, Agent, or Firm* — Oblon, McClelland, Maier & Neustadt, L.L.P.

(57) ABSTRACT

A system LSI including: a first group including a first CPU and a first module; a second group including a second CPU and a second module having the same configuration as the first module has; and a shared memory including a first area for which cache coherency is maintained by an access from the first group, and a second area for which cache coherency is maintained by an access from the second group, the shared memory electrically connected to the first group and the second group. The first group includes a first bus through which cache coherency is maintained between the first CPU and the first module, and a second bus which electrically connects the first bus and the first module to each other. The second group includes a third bus through which cache coherency is maintained between the second CPU and the second module, and a fourth bus which electrically connects the third bus and the second module to each other.

11 Claims, 14 Drawing Sheets

(51) Int. Cl.
*G06F 13/00* (2006.01)
*G06F 12/0811* (2016.01)
*G06F 12/0817* (2016.01)
*G06F 12/0831* (2016.01)
*G06F 12/02* (2006.01)

(52) U.S. Cl.
CPC ........ *G06F 12/0284* (2013.01); *G06F 12/082* (2013.01); *G06F 12/084* (2013.01); *G06F 12/0811* (2013.01); *G06F 12/0826* (2013.01); *G06F 12/0835* (2013.01); *G06F 13/00* (2013.01); *G06F 12/0831* (2013.01); *G06F 2212/1032* (2013.01); *G06F 2212/1048* (2013.01); *G06F 2212/1056* (2013.01); *G06F 2212/621* (2013.01)

(58) Field of Classification Search
USPC .......................................................... 714/49
See application file for complete search history.

(56) References Cited

U.S. PATENT DOCUMENTS

| | | | | |
|---|---|---|---|---|
| 5,805,797 | A * | 9/1998 | Sato | B61L 3/008 714/48 |
| 5,890,217 | A * | 3/1999 | Kabemoto | G06F 12/0817 711/120 |
| 6,209,064 | B1 * | 3/2001 | Weber | G06F 12/0813 711/100 |
| 6,263,405 | B1 * | 7/2001 | Irie | G06F 12/0813 711/140 |
| 7,590,869 | B2 * | 9/2009 | Hashimoto | G06F 21/72 380/228 |
| 8,380,936 | B2 * | 2/2013 | Takeda | G06F 12/0804 711/144 |
| 2002/0004887 | A1 * | 1/2002 | Kubo | G06F 12/0815 711/147 |
| 2004/0030841 | A1 * | 2/2004 | Nanda | G06F 12/0826 711/144 |
| 2005/0010728 | A1 * | 1/2005 | Piry | G06F 12/0831 711/147 |
| 2008/0244192 | A1 * | 10/2008 | Uchiyama | G06F 12/0808 711/144 |
| 2015/0095008 | A1 * | 4/2015 | Wang | G06F 11/3608 703/20 |
| 2015/0169456 | A1 * | 6/2015 | Suzuki | G06F 12/0815 711/123 |
| 2018/0157549 | A1 * | 6/2018 | Han | G06F 11/1641 |

FOREIGN PATENT DOCUMENTS

| | | |
|---|---|---|
| JP | 10-260897 | 9/1998 |
| JP | 2001-515633 | 9/2001 |
| JP | 2003-316752 A | 11/2003 |
| JP | 2004-199579 A | 7/2004 |
| JP | 2009-238056 | 10/2009 |
| WO | WO 99/55531 | 7/1999 |

* cited by examiner

SYSTEM LSI AND FAULT DETECTION METHOD FOR SYSTEM LSI

CROSS-REFERENCE TO RELATED APPLICATIONS

This application is based upon and claims the benefit of priority from Japanese Patent Application No. 2017-178233, filed on Sep. 15, 2017, and the entire contents of which are incorporated herein by reference.

FIELD

Embodiments described herein relate to a system LSI and fault detection method for a system LSI.

BACKGROUND

A system LSI (LSI large scale integrated circuit) Mounted on an automobile is required to achieve a high automotive safety integrity level (ASIL).

In order to ensure high safety, a system LSI needs to be equipped with a fault detection mechanism in addition to main functions, but this complicates the implementation of a large-scale system LSI.

In a large-scale system LSI, especially, simple duplexing of hardware or mounting of ad-hoc fault detection circuits requires extremely high costs in aspects such as a circuit area and a development period.

Furthermore, for a multi-core LSI in which cache coherency should be maintained, fault detection processing by software is even more complicated.

DETAILED DESCRIPTION

Hereinafter, a system LSI and a fault detection method for a system LSI according to embodiments are described in detail with reference to the accompanying drawings. It should be noted that these embodiments are not intended to be limiting. Moreover, the following description first briefly explains problems of a system LSI in a comparative example, and then explains the embodiments.

Figure 1A:
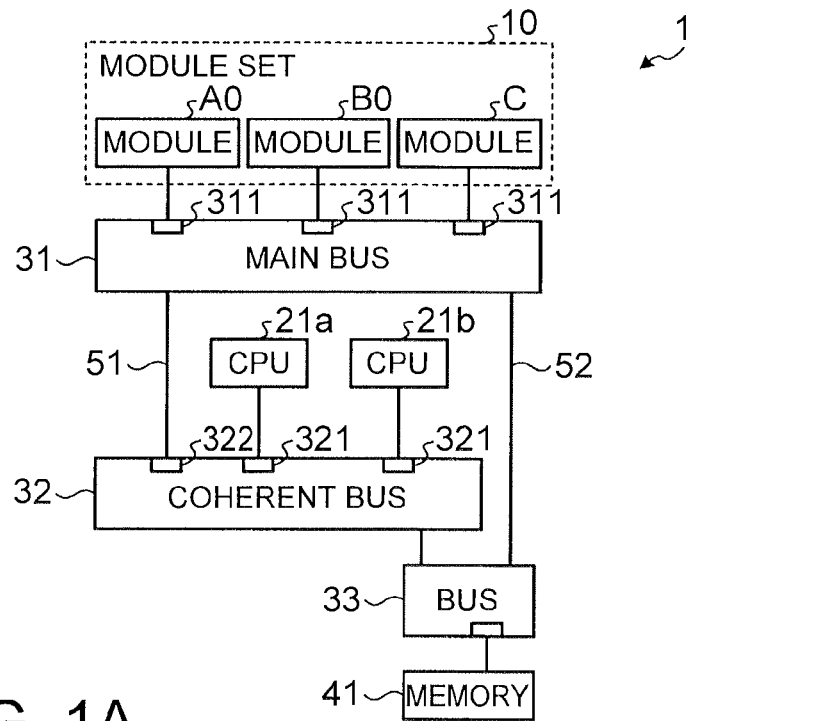
FIGS. 1A and 1B are diagrams illustrating examples of a hardware configuration of a system LSI in a comparative example.
Figure 1B:
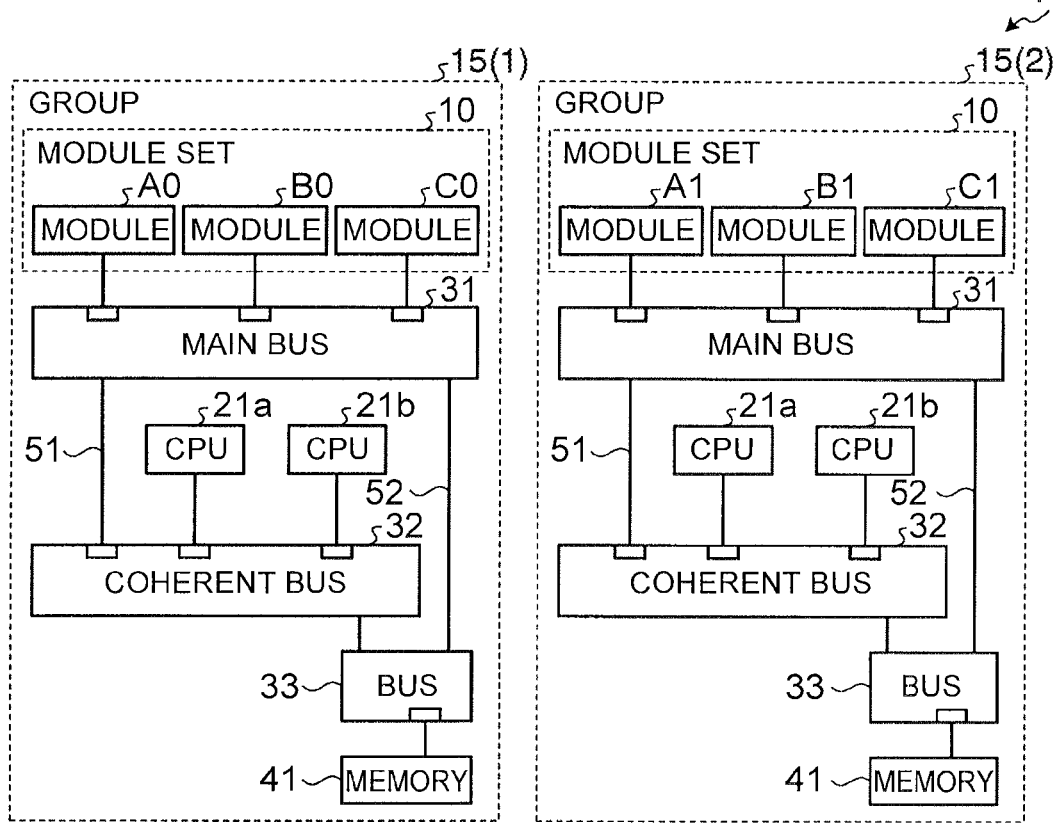

FIGS. 1A and 1B are diagrams illustrating examples of a hardware configuration of a system LSI in a comparative example. FIG. 1A illustrates a system LSI having a configuration that establishes cache coherency among a plurality of CPUs. Here, the system LSI is a one chip LSI in which processors or peripheral circuits, each of which has been an independent LSI chip so far, are mounted. Conventionally, a processor is formed of one or a plurality of LSI chips in most cases. However, such a system LSI is fabricated nowadays along with the enhancement of the degree of integration of LSIs. The system LSI is also called a system on chip (SOC) or the like. In addition, the processors mounted in the system LSI are called processor cores or the like.

A system LSI 1 includes a module set 10, a plurality of CPUs 21a, 21b, and a memory 41, which are connected to each other through a plurality of buses 31 to 33. The module set 10 (module group) includes one or more master modules (hereinafter referred to as modules) which execute predetermined functions. For example, the module is a central processing unit (CPU), a dedicated image processing circuit, or the like, and is hardware which executes processing according to a program. The module set 10 is connected to the main bus 31. It this example, the module set 10 includes modules A0, B0, C.

In this system LSI 1, the CPUs 21a, 21b and the modules A0, B0, C among which cache coherency is to be established are connected to each other through the coherent bus 32. The modules A0, B0, C are connected to the coherent bus 32 through the main bus 31. Master agents 321, 322 are provided at Connection points of the coherent bus 32 to the CPUs 21a, 21b and the main bus 31, respectively. The master agents 321, 322 perform communications in accordance with a cache coherent protocol to maintain cache coherency among the CPUs 21a, 21b, the modules A0, B0, and the memory 41. As illustrated in FIG. 1A, the CPUs 21a, 21b are not directly connected to the main bus 31, but are connected to the main bus 31 via the coherent bus 32. Thus, information exchanged to maintain cache coherency between the CPUs 21a, 21b is not transmitted through the main bus 31, In other words, information transmitted through the main bus 31 does not affect information for maintaining the cache coherency.

Here, the CPUs 21a, 21b may be a CPU core, or a CPU cluster including a plurality of CPU cores. When the CPUs 21a, 21b are a CPU cluster, cache coherency is established among a plurality of CPU cores constituting the CPU cluster, and is connected to the coherent bus 32 on a cluster basis.

The memory 41 is accessed by the CPUS 21a, 21b and the module set 10. The memory 41 is connected to the bus 33. Although not illustrated, the memory 41 has a coherent area for storing data that requires cache coherency to be established and a non-coherent area for storing data that does not require cache coherency to be established. The coherent area and the non-coherent area are demarcated by boundary addresses in the space in the memory 41. The coherent area is accessed via a path 51 or through the coherent bus 32, whereas the non-coherent area is accessed via a path 52.

Here, master agents 311 are provided at connection points of the main bus 31 to the modules A0, B0, C. The master agent 311 is a circuit or a module that switches between paths in the main bus 31 depending on whether an access address in the memory 41 requested by the module A0, B0, C is in the coherent area or the non-coherent area. The master agent 311 switches to a path leading to the path 51 in the case of an access to the coherent area, and switches to a path leading to the path 52 in the case of an access to the nor-coherent area.

One conceivable way to enhance the functional safety of this system LSI 1 based on ASIL is to duplex the hardware configuration in FIG. 1A. FIG. 1B illustrates an example of a system LSI 11 configuration in which the hardware is duplexed. When the configuration illustrated in FIG. 1A is referred to as a group, two groups 15(1), 15(2) having the same hardware configuration are provided as illustrated in FIG. 1B. Here, a module C0 of the module set 10 in the group 15(1) has the same function as the module C, and. modules A1, B1, and C1 of the module set 10 in the group 15(2) have the same functions as the modules A0, B0, C, respectively. In a fault detection for this configuration, it is necessary to check operations of both the groups 15(1), 15(2). Meanwhile, the groups 15(1), 15(2) cannot exchange data between them.

This configuration tends to require high cost due to an increase in the circuit area. In addition, if equipped with a fault detection function, this configuration incurs high cost, and therefore cannot be accepted in usage other than that for high functional safety based on ASIL. That is, another type of system LSI different from the duplexed system LSI 11 should be provided to a user that does not require high functional safety.

In the following embodiments, a description is provided for a system LSI that includes a plurality of groups each including a plurality of CPUs, and is capable of establishing cache coherency among the plurality of CPUs in each of the groups, and performing fault detection for a function requiring high functional safety.

First Embodiment

Figure 2:
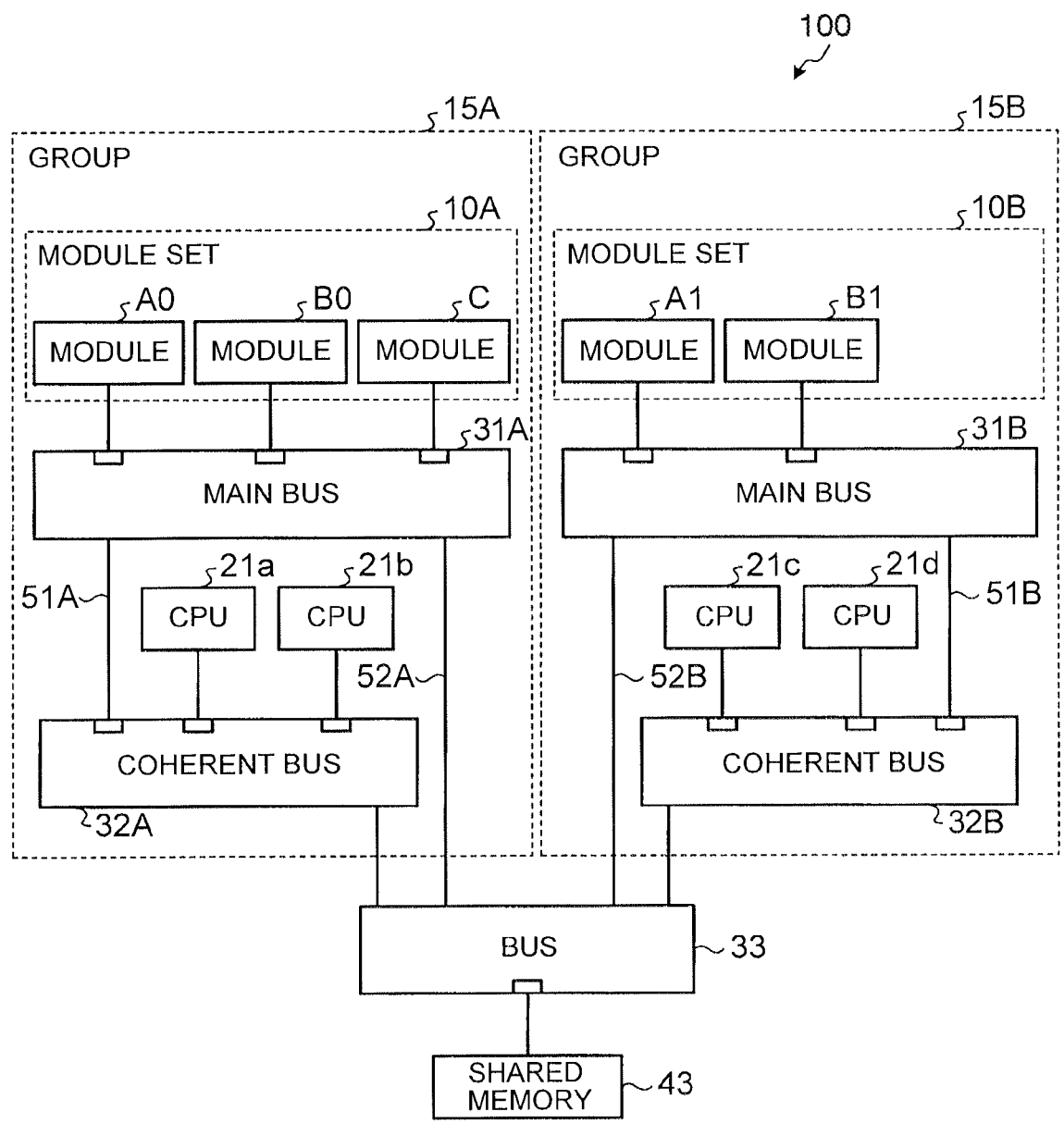
FIG. 2 is a diagram illustrating an example of a hardware configuration of a system LSI according to a first embodiment.

FIG. 2 is a diagram illustrating an example of a hardware configuration of a system LSI 100 according to a first embodiment. In a system LSI 100 according to the first embodiment, a plurality of groups 15A, 15B are connected to a shared memory 43 via a bus 33. In this embodiment, two groups 15A, 15B are connected to the shared memory 43 to achieve high functional safety based on ASIL. Of the groups 15A, 15B, the group 15A is a regular group that executes predetermined functions, whereas the group 15B is a group that executes a fault detection function.

The group 15A includes a module set 10A, a main bus 31A that connects modules A0, B0, C in the module set 10A to each other, a plurality of CPUs 21a, 21b, and a coherent bus 32A that connects the plurality of CPUs 21a, 21b to the main bus 31A. The group 15A is a coherent group in which cache coherency is to be established among the CPUs 21a, 21b and the modules A0, B0, C which belong to the group 15A.

Meanwhile, the group 15B includes a module set 10B, a main bus 31B that connects modules A1, B1 in the module set 10B to each other, a plurality of CPUs 21c, 21d, and a coherent bus 32B that connects the plurality of CPUs 21c, 21d to the main bus 31B. The group 15B is a coherent group in which cache coherency is to be established among the CPUs 21c, 21d and the modules A1, B1 which belong to the group 15B.

In the first embodiment, the groups 15A, 15B are provided with at least one pair of common modules having the same configuration. In other words, one or more of the modules provided to one of the groups are also provided to the other group. In the case of FIG. 2, the group 15A is provided with the modules A0, B0, C, whereas the group 15B is provided with the modules A1, B1. Then, the module A0 of the group 15A and the module A1 of the group 15B have the same function, and the module B0 of the group 15A and the module B1 of the group 15B have the same function. Meanwhile, the module C is provided only to the group 15A. Thus, the group 15B illustrated in FIG. 2 performs a fault detection in execution of an application using the modules A0, B0 of the group 15A. In this embodiment, the modules A0, B0, C, A1, B1, the CPUs 21a to 21d, the coherent buses 32A, 32B, and the main buses 31A, 31B in the groups 15A, 15B are the same as those explained using FIGS. 1A and 1B, and therefore the explanation thereof is omitted herein.

The shared memory 43 stores applications or data to be used in the system LSI 100. The shared memory 43 is connected to both the groups 15A, 15B via the bus 33, and is accessible from all of the master modules including the CPUs 21a to 21d in the system LSI 100. The shared memory 43 is formed of, for example, a general memory element such as a dynamic random access memory (DRAM) or a static RAM (SRAM). This example illustrates the case in which one shared memory 43 is provided in the system LSI 100, but a plurality of shared memories 43 may be provided.

Figure 3:
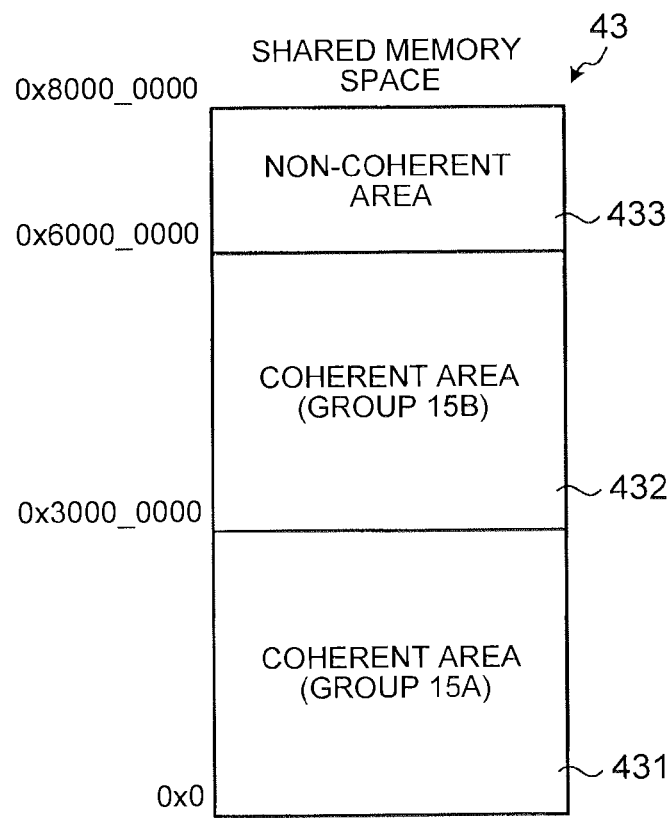
FIG. 3 is a diagram illustrating an example of a memory space in a shared memory according to the first embodiment.

In this configuration, the coherent buses 32A, 32B are connected to the shared memory 43. Thus, to maintain the coherency in the entire system, the shared memory space is logically divided into non-overlapping spaces for the coherent buses 32A, 32B to maintain the coherency, respectively. FIG. 3 is a diagram illustrating an example of the memory space of the shared memory 43 according to the first embodiment. As illustrated in FIG. 3, the space of the shared memory 43 is divided into areas respectively dedicated to the groups each required to establish the coherency. For example, the area specified by the address of 0×0 to 0×3000_0000 is a coherent area 431 which the modules inclusive of the CPUs 21a, 21b in the group 15A are allowed to access. The area specified by the address of 0×3000_0000 to 0×6000_0000 is a coherent area 432 which the modules inclusive of the CPUs 21c, 21d in the group 15B are allowed to access. Then, in this example, the area specified by the address of 0×6000_0000 to 0×8000_0000 is a non-coherent area 433 for storing programs and data for which coherency does not have to be established. The modules in the group 15B are not allowed to access the coherent area 431, whereas the modules in the group 15A are not allowed to access the coherent area 432.

Figure 4:
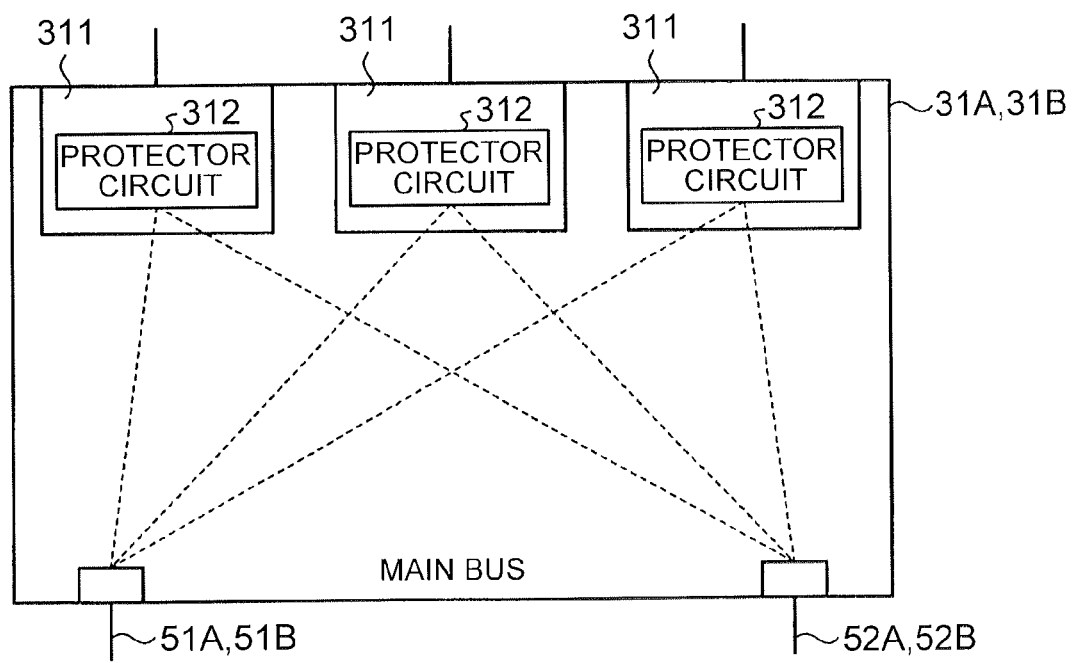
FIG. 4 is a diagram illustrating an example of a hardware configuration of a main bus.

FIG. 4 is a diagram illustrating an example of a hardware configuration of the main buses 31A, 31B. Master agents 311 are provided at connection points of each main bus 31A, 31B to the modules. Each of the master agents 311 includes a protector circuit 312. The protector circuit 312 controls an access by the connected module to the memory space in the shared memory 43 illustrated in FIG. 3 by selecting either of the paths 51A, 51B leading to the coherent bus 32A, 32B and the paths 52A, 52B leading to the bus 33 depending on an access address. To be more specific, if an access address in the shared memory 43 requested by the module in the group to which the main bus 31A, 31B belongs indicates an access to the relevant area in the memory space in the shared memory 43 illustrated in FIG. 3, the protector circuit 312 allows the access and selects the relevant path 51A, 51B, 52A, 52B according to the address in the memory space, but, if not, does not allow the access.

For example, if an access address in the shared memory 43 requested by the module A0, B0, C specifies a location in the coherent area 431, the protector circuit 312 of the group 115A selects the path leading to the path 51A. On the other hand, the protector circuit 312 of the group 15A returns an error to the module A0, B0, C if the access address specifies a location in the coherent area 432, or selects the path leading to the path 52A if the access address specifies a location in the non-coherent area 433.

If an access address in the shared memory 43 requested by the module A1, B1 specifies a location in the coherent area 432, the protector circuit 312 of the group 15B selects the path leading to the path 51B. On the other hand, the protector circuit 312 of the group 15B returns an error to the module A1, B1 if the access address specifies a location in the coherent area 431, or selects the path leading to the path 52B if the access address specifies a location in the non-coherent area 433.

Figure 5A:
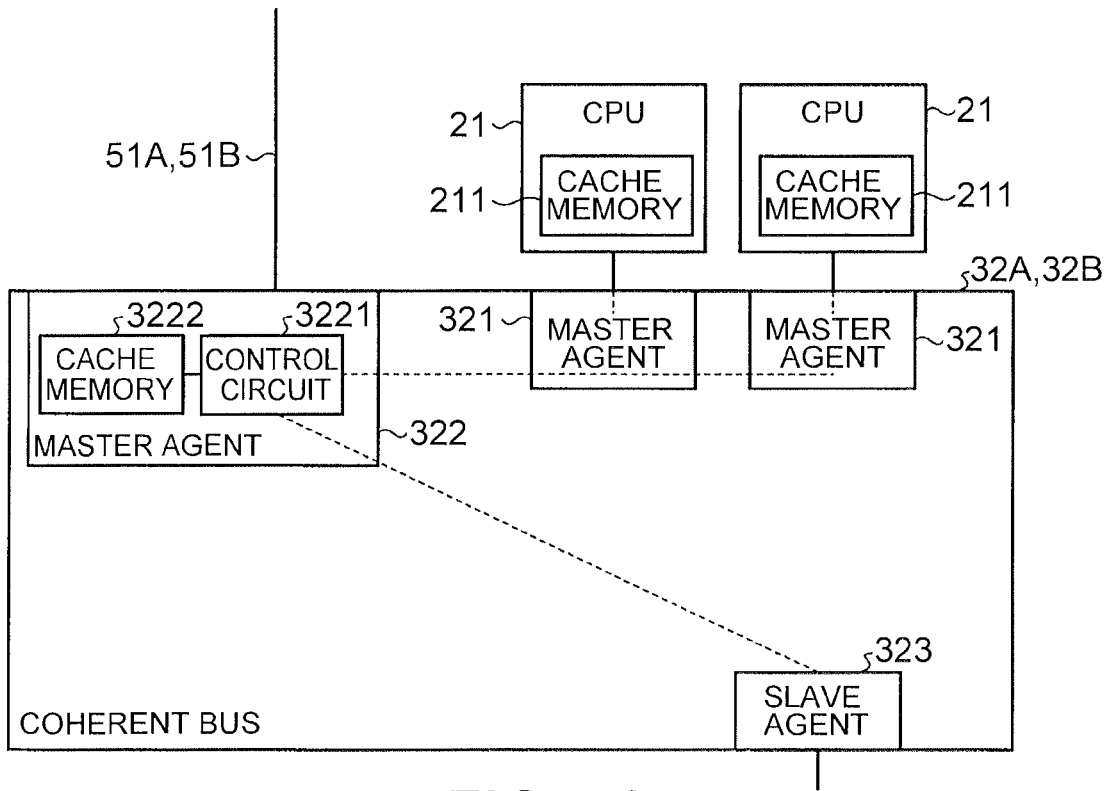
FIGS. 5A and 5B are diagrams illustrating an example of a hardware configuration of a coherent bus.
Figure 5B:
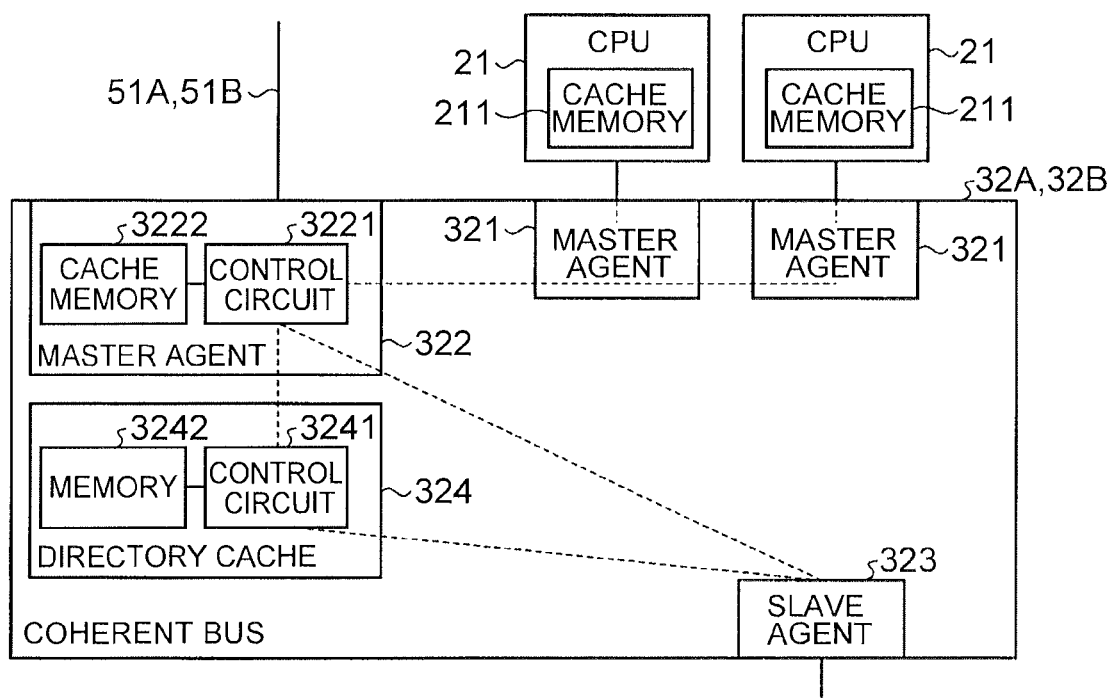

As the coherent buses 32A, 32B, various kinds of buses can be used. FIGS. 5A and 5B are diagrams illustrating examples of hardware configurations of the coherent buses 32A, 32B. FIG. 5A illustrates a configuration in which a directory cache 324 is not provided in the cohereht bus 32A, 32B (a directory cache is provided in the coherent bus 32A, 32B in FIG. 5B). The directory cache makes and stores copies of so-called cache tag information of CPUs, the cache tag information indicating whether a cache memory 211 in each of the CPUs 21 holds data or not, an attribute of data stored in the cache memory 211 in the CPU 21, and the like. In the example in FIG. 5A, a cache tag of the cache memory 211 of each CPU 21 contains information to be held by the directory cache, for example. The coherent bus 32A, 32B includes master agents 321, 322 at connection points to the CPUs 21 and the main bus 31A, 31B, and includes a slave agent 323 at a connection point to the bus 33.

Each of the master agents 321, 322 has a function to transmit and receive data in accordance with the cache coherent protocol. The slave agent 323 performs processing according to commands from the master agents 321, 322.

The master agent 322 includes a control circuit 3221 and a cache memory 3222. The control circuit 3221 receives an access to the shared memory 43 from the module A0, B0, A1, B1, and preforms processing depending on the access. An access to the shared memory 43 is executed in accordance with the cache coherent protocol. The cache memory 3222 stores part of a content in the shared memory 43 read when the module A0, B0, C, A1, B1 accesses the shared memory 43. The cache memory 3222 has a 2-way set associative structure, and includes a valid bit, a tag, and a data field. The data field stores data corresponding to the address. The structure of the cache memory 3222 is not limited to this, and the cache memory 3222 may have another structure.

An outline of processing in the master agent 322 thus configured is explained. Upon receipt of an access to data in the shared memory 43 from any of the modules. A0, B0, C, A1, B1, the control circuit 3221 first checks whether the data to be accessed is stored in the cache memory 3222 of the master agent 322. If the data is stored, the control circuit 3221 returns the data in the cache memory 3222 to the module A0, B0, C, A1, B1 via the main bus 31A, 31B. Meanwhile, if the data is not stored, the control circuit 3221 asks the CPUs 21 connected to the coherent bus 32A, 32B whether the data is cached or not in accordance with the cache coherent protocol. The control circuit 3221 receives the data from the cache memory 211 of one of the CPUs 21 if the cache memory 211 of the CPU 21 holds the data, and fetches the data from the shared memory 43 if non of the cache memories 211 of the CPUs 21 holds the data. Here, whether the cache memory 211 of each of the CPUs 21 holds the data or not is determined based on a directory cache included in the cache memory 211. Moreover, if data in the cache memory 211 of the CPU 21 is updated from the data in the shared memory 43, the corresponding data in the shared memory 43 is also updated.

FIG. 5B illustrates a configuration where a directory cache 324 is provided to the coherent bus 32A, 32B. The directory cache 324 includes a control circuit 3241 and a memory 3242. The control circuit 3241 monitors all data exchanges between the CPUs 21 and the coherent bus 32A, 32B, and stores a directory in the memory 3242, the directory indicating the address and the state of data held by each of the CPUs 21. The directory has, for example, a 2-way set associative structure, and includes a valid bit, a tag, and a data field. The data field stores owner information of each cache line and information on whether or not each cache line is already cached in some location. The structure of the memory 3242 is not limited to this, and the memory 3242 may have another structure. Accesses to the shared memory 43 by the CPUs 21 and accesses to the shared memory 43 by the modules A0, B0, C, A1, B1 are performed via the directory cache 324. The configuration of the master agent 322 is the same as in FIG. 5A.

An outline of processing in the master agent 322 and the directory cache 324 thus configured is explained. Upon receipt of an access to data in the shared memory 43 from any of the modules A0, B0, C, A1, B1, the control circuit 3221 of the master agent 322 first checks whether a latest version of data corresponding to the access address is stored in the cache memory 3222 or not. If the data is stored in the cache memory 3222, the control circuit 3221 returns the data in the cache memory 3222 to the module A0, B0, C, A1, B1 via the main bus 31A, 31B. Meanwhile, if the data is not stored in the cache memory 3222, the control circuit 3221 passes the access address to the directory cache 324. In reference to the directory in the memory 3242, the control circuit 3241 of the directory cache 324 determines whether any of the cache memories 211 of the CPUs 21 holds the data corresponding to the access address. If any of the cache memories 211 of the CPUs 21 holds the data, the control circuit 3241 of the directory cache 324 fetches the data corresponding to the access address from the cache memory 211 of the CPU 21 and returns the data to the module A0, B0, C, A1, B1 via the main bus 31A, 31B. If none of the cache memories 211 of the CPUs 21 holds the data, the control circuit 3241 of the directory cache 324 issues a fetch request for the data concerned, the slave agent 323 fetches the data from the shared memory 43 and passes the fetched data to the master agent 322, and the control circuit 3221 of the master agent 322 returns the data to the module A0, B0, C, A1, B1.

Figure 6:
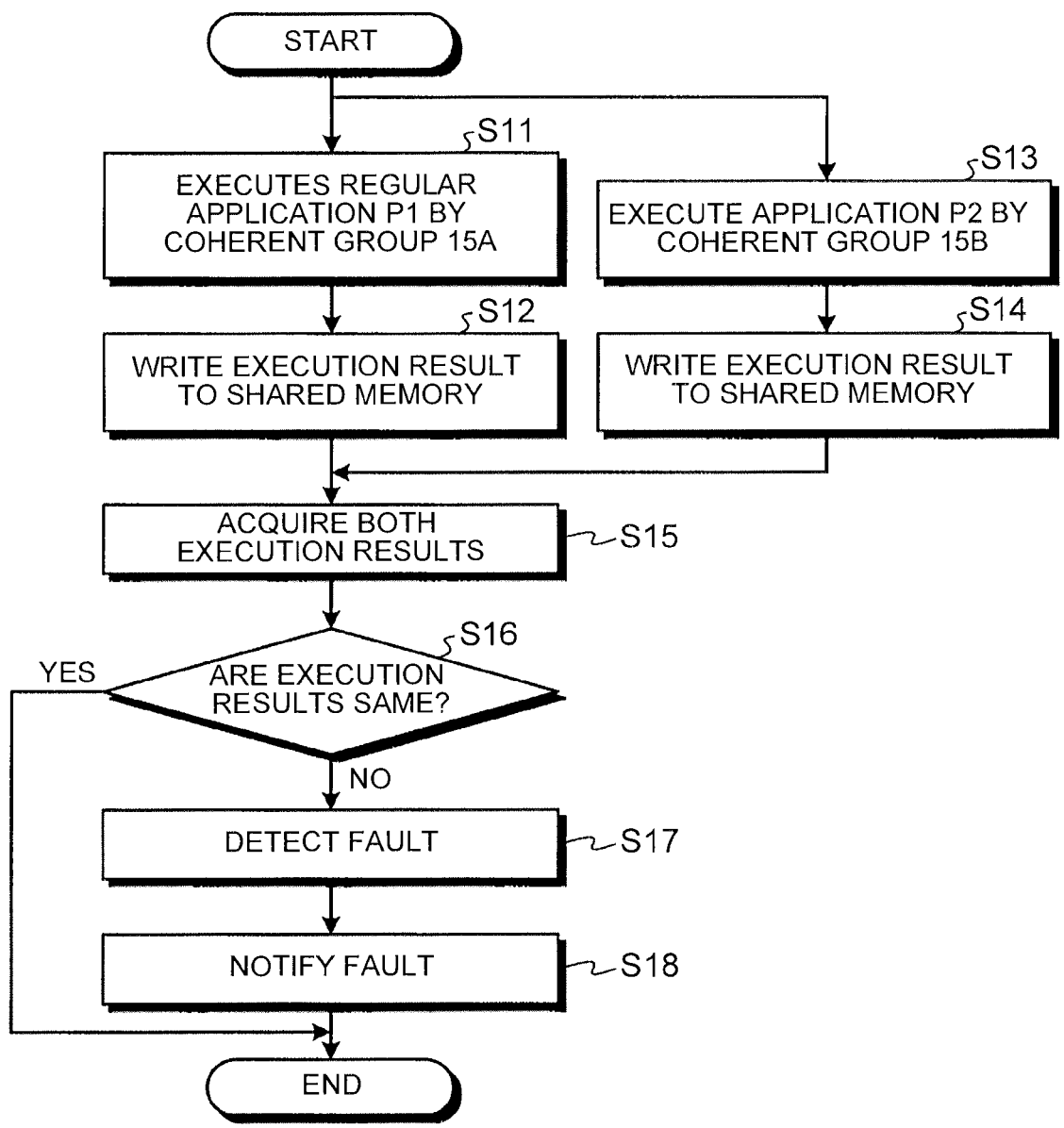
FIG. 6 is a flowchart presenting an example of a procedure of fault detection processing in the system LSI according to the first embodiment.

Next, description is provided for processing in the system LSI illustrated in FIG. 2. FIG. 6 is a flowchart presenting an example of a procedure of fault detection processing in the system LSI according to the first embodiment, Here, the description is provided for a case of fault detection performed in the groups including the modules A, B. Specifically, in the shared memory 43, the coherent area 431 stores an application P1, and the coherent area 432 stores an application P2 that is the same as the application P1. Both of the applications P1, P2 use the modules Ai and Bi (i=0, 1) In addition, the non-coherent area 433 stores a fault detection application Q. Further, the CPU 21d, for example, of the group 15B is running the fault detection application Q in the non-coherent area 433.

First, the group 15A executes the application P1 for regular main processing (step S11). The application P1 is executed by the CPU 21a, for example, and includes data read from and data write to the shared memory 43 during the execution. In addition, the application P1 also includes processing executed by tne modules A0, B0 but does not include processing executed by the module C. Then, the CPU 21a writes the execution result of the application P1 to the coherent area 431 in the shared memory 43 (step S12)

In parallel with the execution of the application P1 in the group 15A, the group 15B executes the application P2 having the same content (step S13). This application P2 is executed for fault detection, and is not used for the regular processing. The application P2 is executed by the CPU 21c, for example, and includes data read from and data write to the shared memory 43 during the execution. In addition, the application P2 also includes processing executed by the modules A1, B1. Then, the CPU 21c writes the execution result of the application P2 to the coherent area 432 in the shared memory 43 (step S14).

Thereafter, the fault detection application Q acquires the execution results of the applications P1, P2 from the shared memory 43 (step S15) and determines whether the two execution results are the same or not (step S16). If the two execution results are the same (Yes in step S16), it is determined that there is no fault in the system LSI 100, and the processing is terminated. On the other hand, if the two execution results are different (No in step S16), it is determined that there is a fault in the system LSI 100 (step S17), and a notification of the fault is made (step S18). The fault notification may be made in a method of displaying information that the fault occurs on a display unit connected to the system LSI 100, or lighting an indicator provided on a package containing the system LSI 100 and configured to indicate a fault occurrence. The fault notification in this example indicates that the fault occurs in any of the groups 15A, 15B, and does not identify in which of the groups the fault occurs. Then, the processing is terminated.

According to the embodiment, a system LSI that includes a plurality of groups each including a CPU and is capable of achieving high functional safety with a simple procedure, and a fault detection method for a system LSI, can be provided.

The system LSI 100 according to the first embodiment causes the two groups 15A, 15B to execute the same applications P1, P2 and detect a fault in the system LSI 100 by comparing the two execution results.

The two groups 15A, 15B do not have to have completely the same hardware configurations, as described above. The two groups 15A, 15B only have to be provided with common modules required by a function for which a fault detection is desired. For this reason, the group 15A, which implements the main functions, may be provided with a module not provided to the group 15B, which implements the fault detection function. In this case, however, the fault detection in the module not provided to the group 15B cannot be performed. In the above explanation, the group 15B executes the fault detection application Q, but instead the group 15A may execute the fault detection application Q.

The configuration in FIG. 2 is capable of detecting the occurrence of a fault in the system LSI 100, but is incapable of identifying which of the groups 15A, 15B has the fault. Hence, description is now provided for a system LSI capable of identifying a group having a fault.

Figure 7:
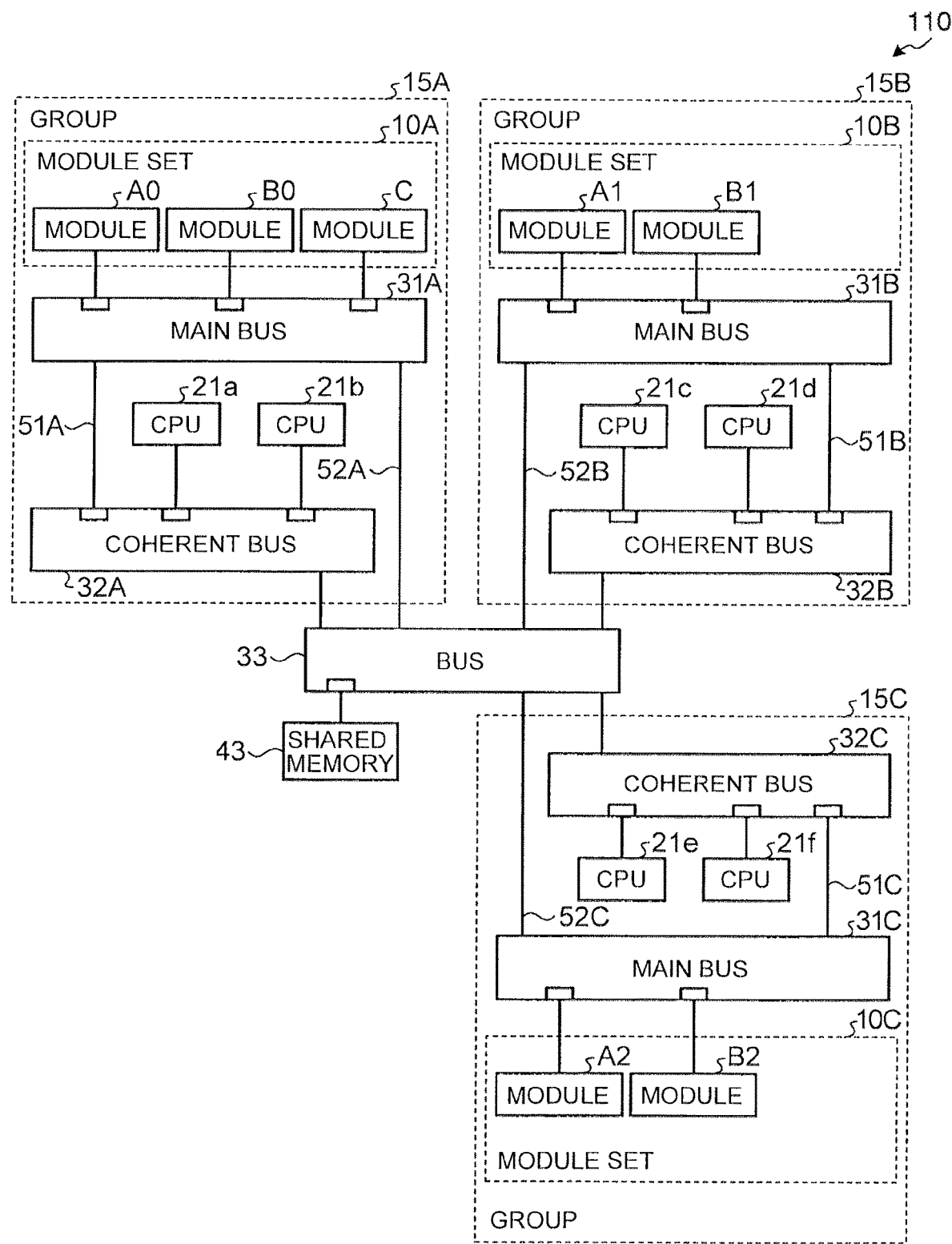
FIG. 7 is a diagram illustrating another example of a hardware configuration of the system LSI according to the first embodiment.

FIG. 7 is a diagram illustrating another example of a hardware configuration of the system LSI 110 according to a modification of the first embodiment. FIG. 7 illustrates a case in which three groups 15A to 15C are connected to a shared memory 43. Here, in the system LSI 110 in FIG. 7, the group 15C having the same configuration as the group 15B is connected to the shared memory 43 via the bus 33. The grow 15C includes a module set 10C including a module A2 having the same configuration as the module A0 and a module B2 having the same configuration as the module B0. The modules A2, B2 are connected to a main bus 31C. As in the groups 15A, 15B, the group 15C includes two CPUs 21e, 21f connected to a coherent bus 32C. The coherent bus 32C is connected to the main bus 31C. The main bus 31C is connected to the coherent bus 32C via a path 51C, and is connected to the bus 33 via a path 52C. Here, the same constituent elements as those described above are omitted from the explanation.

Figure 8:
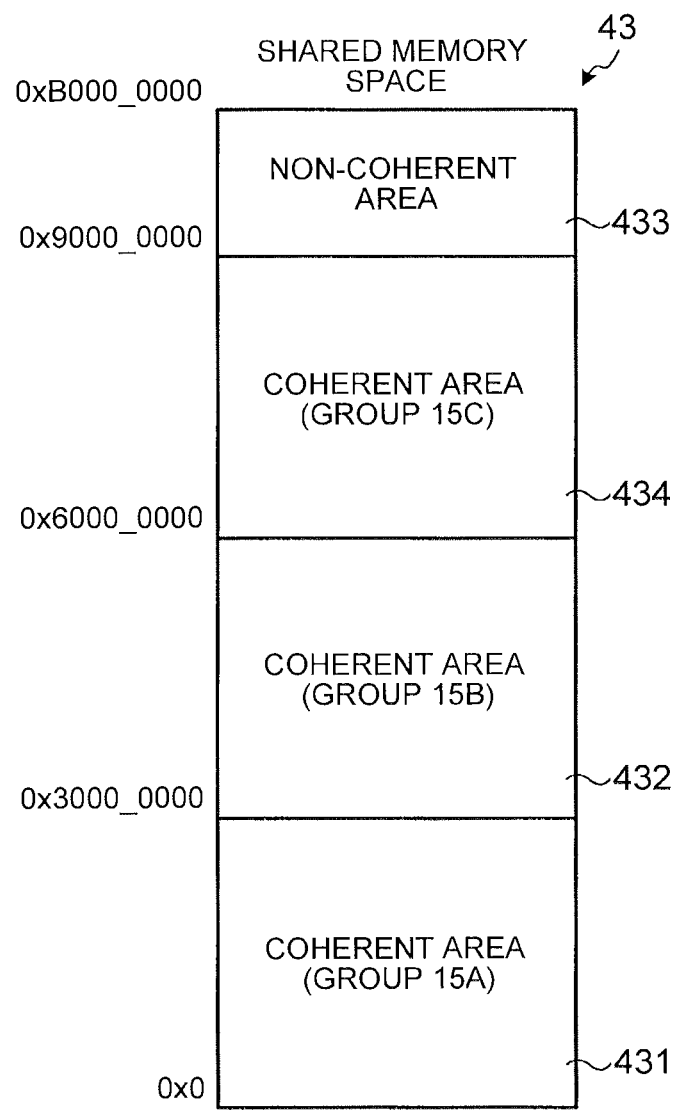
FIG. 8 is a diagram illustrating an example of a shared memory space in the case of FIG. 7.

FIG. 8 is a diagram illustrating an example of a shared memory space in the case of FIG. 7. As illustrated in. FIG. 8, the shared memory 43 includes a coherent area 431 for use by the group 15A, a coherent area 432 for use by the group 15B, a coherent area 434 for use by the group 15C, and a non-coherent area 433. These areas are demarcated by boundary addresses.

By causing all the three groups 15A to 15C to execute the same applications using the modules Ai and Bi (i=0 to 2), the system LSI 110 thus configured can identify, when detecting a fault, which group has the fault in accordance with a majority rule using the execution results. Specifically, the execution results of the applications by the three groups 15A to 15C are acquired, and are compared with each other. As a result of the comparison, if the three execution results are the same, the system LSI 110 can determine that no fault occurs. Meanwhile, if any one of the execution results is different from the other two execution results, the system LSI 110 can determine that there is a cause for the fault in the group having the different execution result. Here, if all the execution results are different from each other, the system LSI 110 can determine that the entire system LSI 110 has faults. Here, in the system LSI 110, four or more groups may be connected to the shared memory 43. Also in this case, the execution results of the same applications by the groups are compared with each other, and the group having a fault can be identified in accordance with the majority rule.

In the first embodiment, the plurality of groups 15A, 15B each including the plurality of CPUs and modules are connected to the shared memory 43. The groups 15A, 15B include the main buses 31A, 31B, the modules Ai, Bi, C are connected to the main buses 31A, 31B, and the CPUs 21a to 21d are connected to the main buses 31A, 31B via the coherent buses 32A, 32B. The modules Ai, Bi, in which fault detection is desired, are provided in common to the plurality of groups 15A, 15B. In addition, the shared memory space of the shared memory 43 is logically divided into the non-overlapping spaces for the coherent buses 32A, 32B to maintain the coherency. Then, the groups 15A, 15B are caused to execute, independently of each other, the applications which use the modules Ai, Bi common to the groups 15A, 15B, and the execution results are compared. This operation produces an effect of enabling easy implementation of the fault detection in the system LSI 100, 110 while achieving high functional safety. Moreover, this configuration is applicable to a large-scale system LSI 100, 110 required to ensure the cache coherency, and enables implementation of an application requiring high functional safety while ensuring the cache coherency.

Moreover, in the case of the large-scale system LSI 100, 110, the cost is extremely high if the functional safety is ensured by providing all the modules with dedicated fault detection mechanisms, by duplexing the entire hardware, or the like. In the first embodiment, however, the groups 15A, 15B are duplexed in terms of the hardware, but the cost can be reduced as compared with the case in which the functional safety is ensured by hardware, because the fault detection is performed through dual execution of applications.

Second Embodiment

Figure 9:
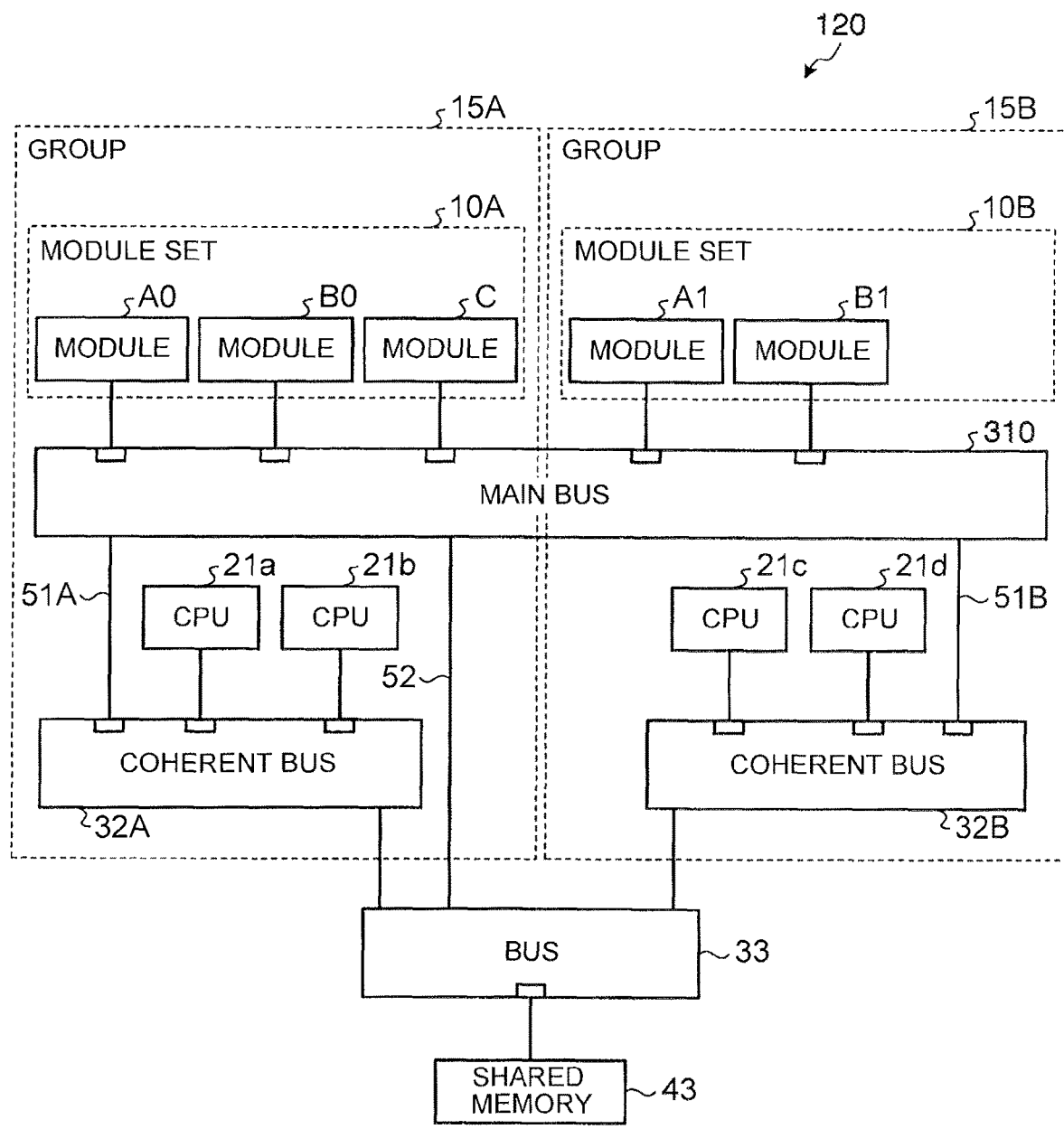
FIG. 9 is a diagram illustrating an example of a hardware configuration of a system LSI according to a second embodiment.

FIG. 9 is a diagram illustrating an example of a hardware configuration of a system LSI 120 according to a second embodiment. In the second embodiment, a main bus 310 is provided to groups in common. Specifically, the main buses 31A, 31B are respectively provided to the groups 15A, 15B in the first embodiment as illustrated in FIG. 2, whereas the main bus 310 provided across the two groups 15A, 15B is used in the second embodiment as illustrated in FIG. 9. In addition, for non-coherent data, a shared memory 43 is accessed from the main bus 310 via a path 52 and a bus 33. The other configuration is the same as that in the first embodiment, and the explanation thereof is omitted herein.

Figure 10:
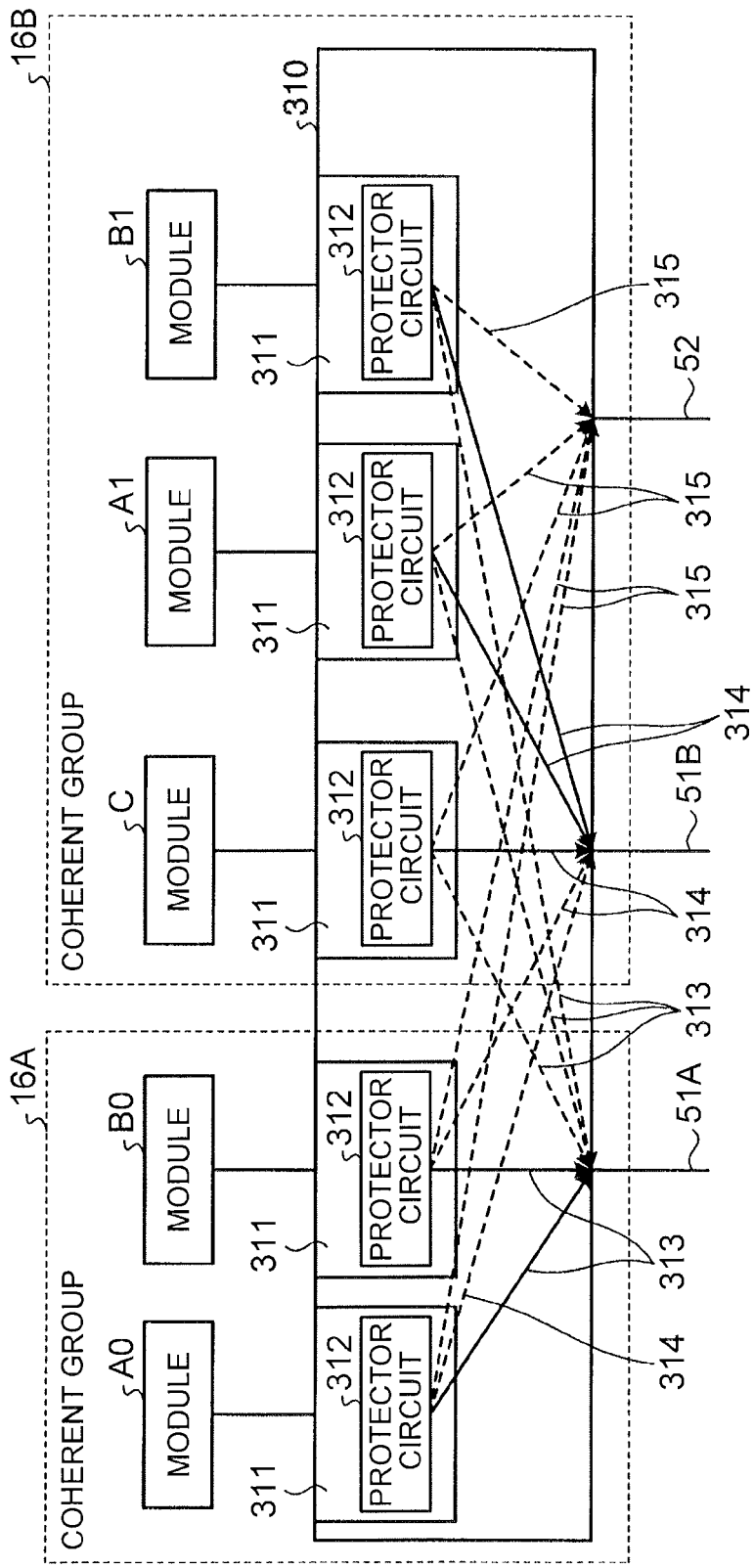
FIG. 10 is a diagram illustrating an example of a hardware configuration of a main bus.

FIG. 10 is a diagram illustrating an example of a hardware configuration of the main bus 310. Master agents 311 are provided to connection points of the main bus 310 to modules Ai, Bi, C (i=0, 1). Each of the master agents 311 includes a protector circuit 312. The protector circuit 312 controls accesses by the module Ai, Bi, or C to the memory space in the shared memory 43 illustrated in FIG. 3. Specifically, paths 313, 314, 315 connected to paths 51A, 51B, 52, respectively, are connected to each protector circuit 312, and which of the paths 313 to 315 are accessible (or is not accessible) is set in each protector circuit 312. Here, the protector circuits 312 are set to disable the modules A0, B0 from accessing the path 314, i.e., the coherent area 432 in the shared memory 43, and disable the modules C, A1, B1 from accessing the path 313, i.e., the coherent area 431 in the shared memory 43. Which of the paths 313 to 315 each protector circuit 312 can access (or cannot access) is set according to the settings loaded at a time of starting of the system LSI 120. For example, the settings can be changed as appropriate, and the change in the settings is reflected after the system LSI 120 is re-started.

As similar to the explanation in the first embodiment, the protector circuit 312 controls accesses to the shared memory 43 from the module Ai, Bi, or C. For example, consider cases of the protector circuit 312 connected to the module A0. The protector circuit 312 allows an access if the access is to the coherent area 431 in the shared memory 43 and the module A0 accesses the shared memory 43 via the paths 313, 51A. In addition, if the access is to the non-coherent area 433 in the shared memory 43, the protector circuit 312 allows the access, and the module A0 accesses the shared memory 43 via the paths 315, 52. On the other hand, if the access is to the coherent area 432 in the shared memory 43, the protector circuit 312 does not allow the access, and returns an error to the module A0.

In the first embodiment, the main buses 31A, 31B are physically divided to form the groups 15A, 15B. In contrast, in the second embodiment, because of the presence of the main bus 310 provided in common to the groups 15A, 15B, the modules are classified into coherent groups according to the settings of the protector circuits 312. In the example of FIG. 10, the modules A0, B0 are set to be disabled from accessing the path 314, and the modules A0, B0 and the CPUs connected to the paths 313, 51A form a coherent group 16A in which cache coherency is maintained among them. Then, the modules C, A1, B1 are set to be disabled from accessing the path 313, and the modules C, A1, B1 and the CPUs connected to the paths 314, 51B form a coherent group 16B in which cache coherency is maintained among them. As a result, the physical groups 15A, 15B illustrated in FIG. 9 are different from the logical groups 16A, 16B illustrated in FIG. 10. In this way, although the coherent groups cannot be changed in the configuration illustrated in FIG. 2 in the first embodiment, the coherent groups 16A, 16B can be changed at any time by changing the settings of the protector circuits 312 in the main bus 310 in the second embodiment.

The second embodiment can also execute fault detection processing in the same way as in the first embodiment.

In the second embodiment, the common main bus 310, in place of the main buses 31 respectively provided to the groups 15A, 15B, is connected to the plurality of groups 15A, 15B in a cross-group fashion. Then, the paths to be used, i.e. the areas in the shared memory 43 accessible by each of the modules Ai, Bi, C, are selected by the corresponding one of the protector circuits 312 provided in the main bus 310. In this way, the modules and the CPUs allowed to access a common area in the shared memory 43 form the coherent group 16A, 16B. This resultantly makes it possible to produce an effect of flexibly exchanging modules constituting each group while maintaining the independence of each group from the groups as in the first embodiment.

Third Embodiment

Figure 11:
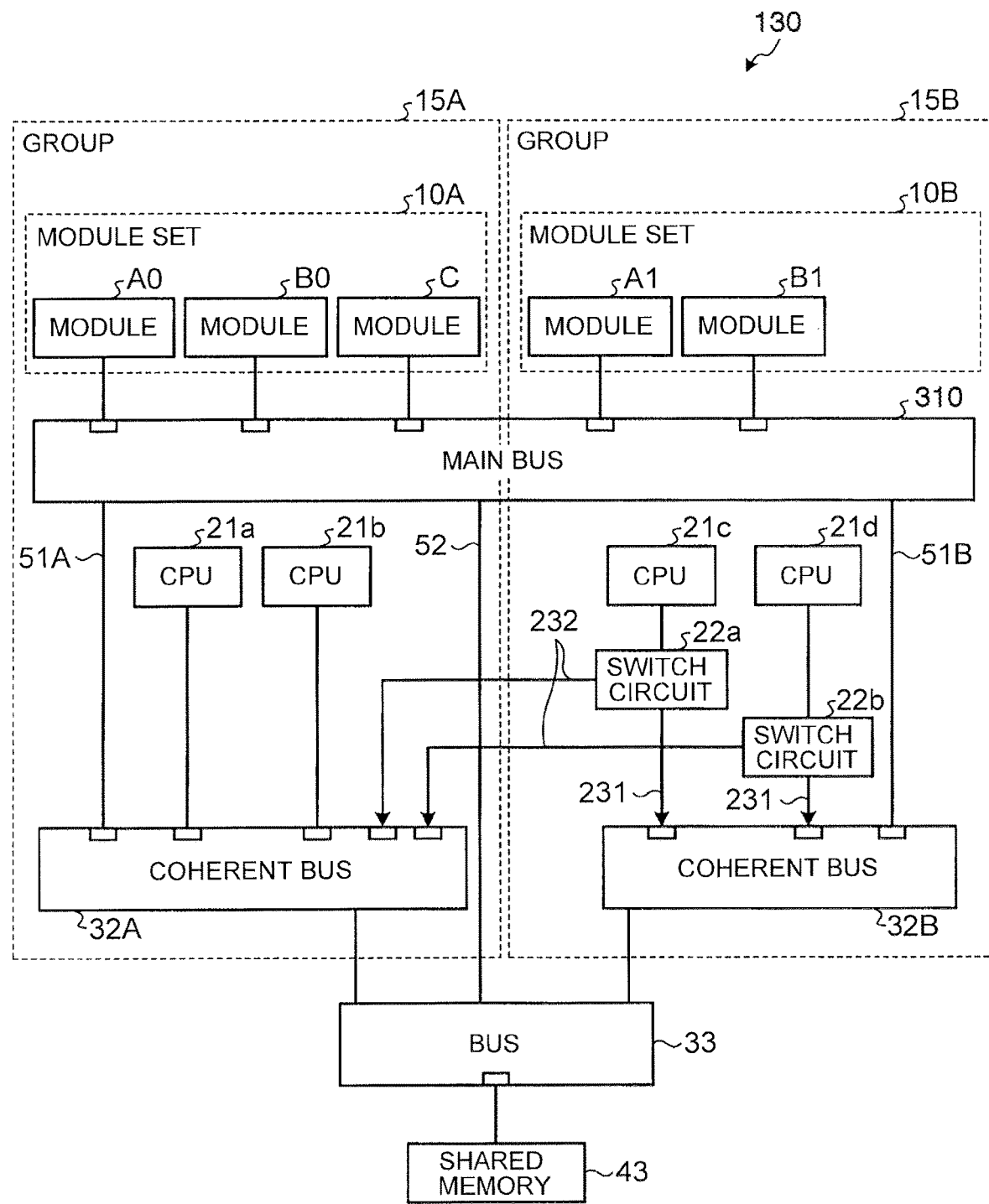
FIG. 11 is a diagram illustrating an example of a hardware configuration of a system LSI according to a third embodiment.

FIG. 11 is a diagram illustrating an example of a hardware configuration of a system LSI 130 according to a third embodiment. In the third embodiment, one of groups, namely, a group 15B, is provided with switch circuits 22a, 22b between CPUS 21c, 21d and a coherent bus 32B. Each of the switch circuits 22a, 22b switches between a first path 231 and a second path 232, the first path 231 leading from the CPU 21c, 21d to a coherent bus 32B belonging to the same group 15B as that of the CPU 21c, 21d, the second path 232 leading from the CPU 21c, 21d to a coherent bus 32A belonging to a group 15A different from that of the CPU 21c, 21d. For example, a multiplexer is used as the switch circuit 22a, 22b.

In the case of use with the functional safety taken into account, the switch circuits 22a, 22b select the first paths 231. With this selection, the configuration in the third embodiment is made the same as in the second embodiment.

Meahwhile, in the case of use without the functional safety taken into account, the switch circuits 22a, 22b select the second paths 232. With this selection, the CPUs 21c, 21d perform operations to establish the cache coherency with the CPUs 21a, 21b in the different group 15A. For example, in the case of FIG. 11, the two CPUs 21c, 21d in the group 15B belong to the same coherent group to which the CPUs 21a, 21b in the group 15A belong.

In addition, when the switch circuits 22a, 22b select the second paths 232, all the accesses from the main bus 310 are transmitted via the path 51A to the coherent bus 32A and to the shared memory 43. In other words, the protector circuits 312 are set to disconnect the path 51B.

In the system LSI 130 thus configured, the four CPUs 21a to 21d form the group when the switch circuits 22a, 22b select the second paths 232, and a plurality of applications can be executed in the group. Moreover, modules having the same configuration may be used to perform different types of calculations. As a result, the computation amount of the entire system can be increased.

The switching of the switch circuits 22a, 22b is fixed before the system LSI 130 is started. For example, the path is switched when the system is reset, or is switched by using fuses.

In the third embodiment, the switch circuits 22a, 22b are provided between the CPUs 21c, 21d and the coherent bus 32B in the one group 15B, and switch between the first paths 231 leading to the coherent bus 32B in the group 15B to which the CPUs 21c, 21d belong and the second paths 232 leading to the coherent bus 32A in the different group 15A. This produces an effect of making the system LSI 130 usable for a case in which there is no need to achieve high functional safety in combination with fault detection by software. Moreover, in this case, the system LSI 130 is not used to achieve the high functional safety, but is used to perform processing by using all the resources including all the modules Ai, Bi, C, thereby supporting use in a case in which importance is placed on the performance rather than the functional safety. Further, since the coherency can be managed only on the coherent bus 32A side, it is possible to reduce power consumption and simplify the management of the shared memory areas.

Fourth Embodiment

Figure 12:
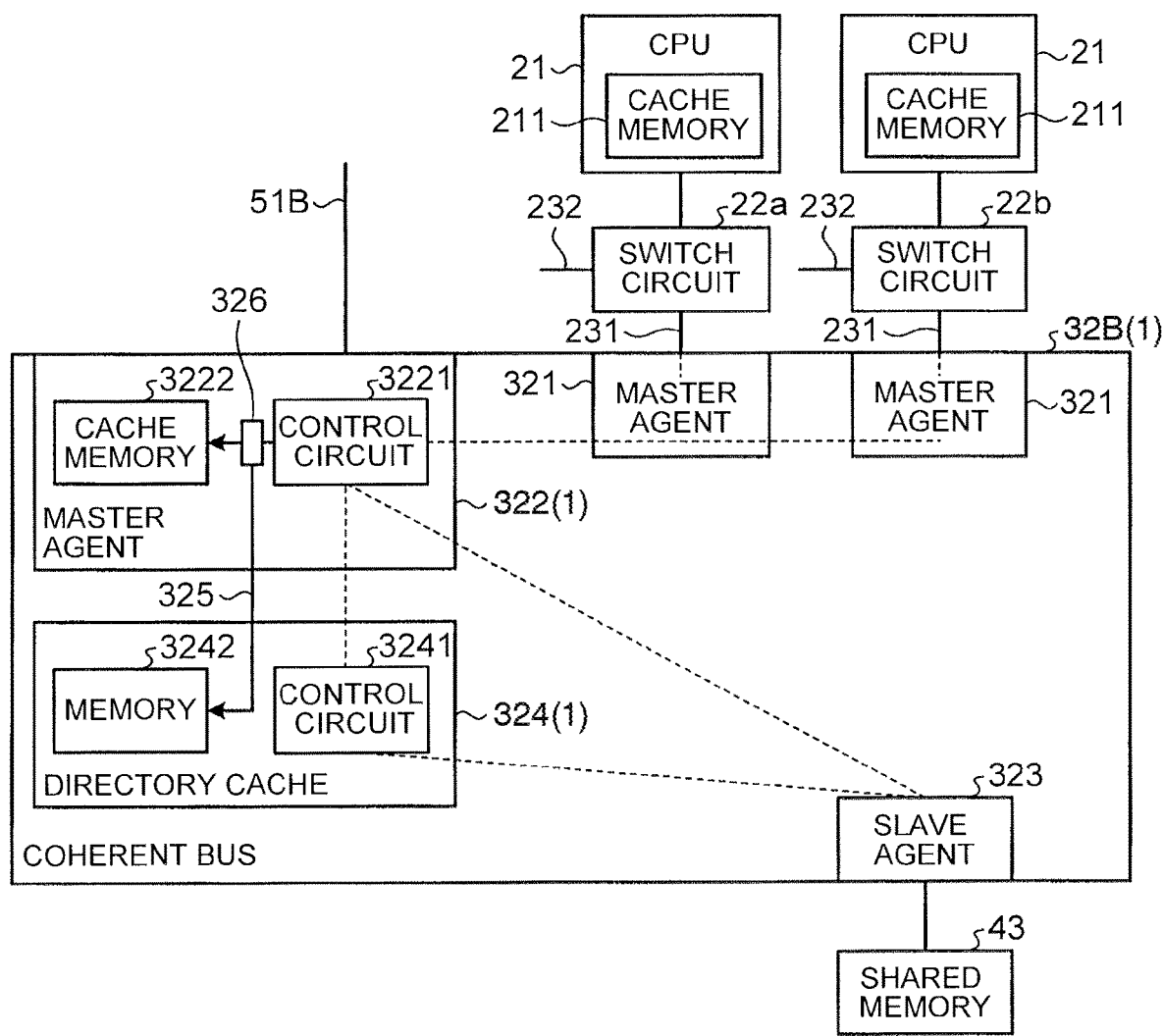
FIG. 12 is a diagram illustrating an example of a hardware configuration of a system LSI according to a fourth embodiment.

FIG. 12 is a diagram illustrating an example of a configuration of a coherent bus used in a system LSI according to a fourth embodiment. In the third embodiment, when the paths of the CPUs 21c, 21d in the group 15B are switched to the second paths 232, the coherent bus 32B(1) is out of use. Meanwhile, as in the coherent bus 32B illustrated in FIG. 5B in the first embodiment, the master agent 322(1) includes the cache memory 3222 and the directory cache 324(1) includes the memory 3242. In this case, if the coherent bus 32B(1) is out of use, the directory cache 324 in the coherent bus 32B(1) is also out of use. Therefore, in the fourth embodiment, the memory 3242 of the directory cache 324 in the coherent bus 32B(1) out of use is utilized anew as a RAM for caching non-coherent accesses.

The coherent bus 32B(1) illustrated in FIG. 12 basically has the same configuration as that of the coherent bus 32B described in reference to FIG. 5B. Differences in the configuration from FIG. 5B are described below. The coherent bus 323(1) includes a path (wiring) 325 that connects the memory 3242 in the directory cache 324 and the control circuit 3221 in the master agent 322, and a selector circuit 326 that switches between the use and non-use of the path 325. The selector circuit 326 selects the path to disable the use of the path 325 when the switch circuits 22a, 22b select the paths 231, and to enable the use of the path 325 when the switch circuits 22a, 22b select the paths 232.

The memory 3242 of the directory cache 324 is, for example, 2-way set associative and has a cache structure including a valid bit, a tag, and a data field. When the selector circuit 326 disables the use of the path 325, the data field stores owner information of each cache line and information on whether or not each cache line is already cached in some location. Instead, when the selector circuit 326 enables the use of the path 325, the data field stores data corresponding to the address.

Figure 13:
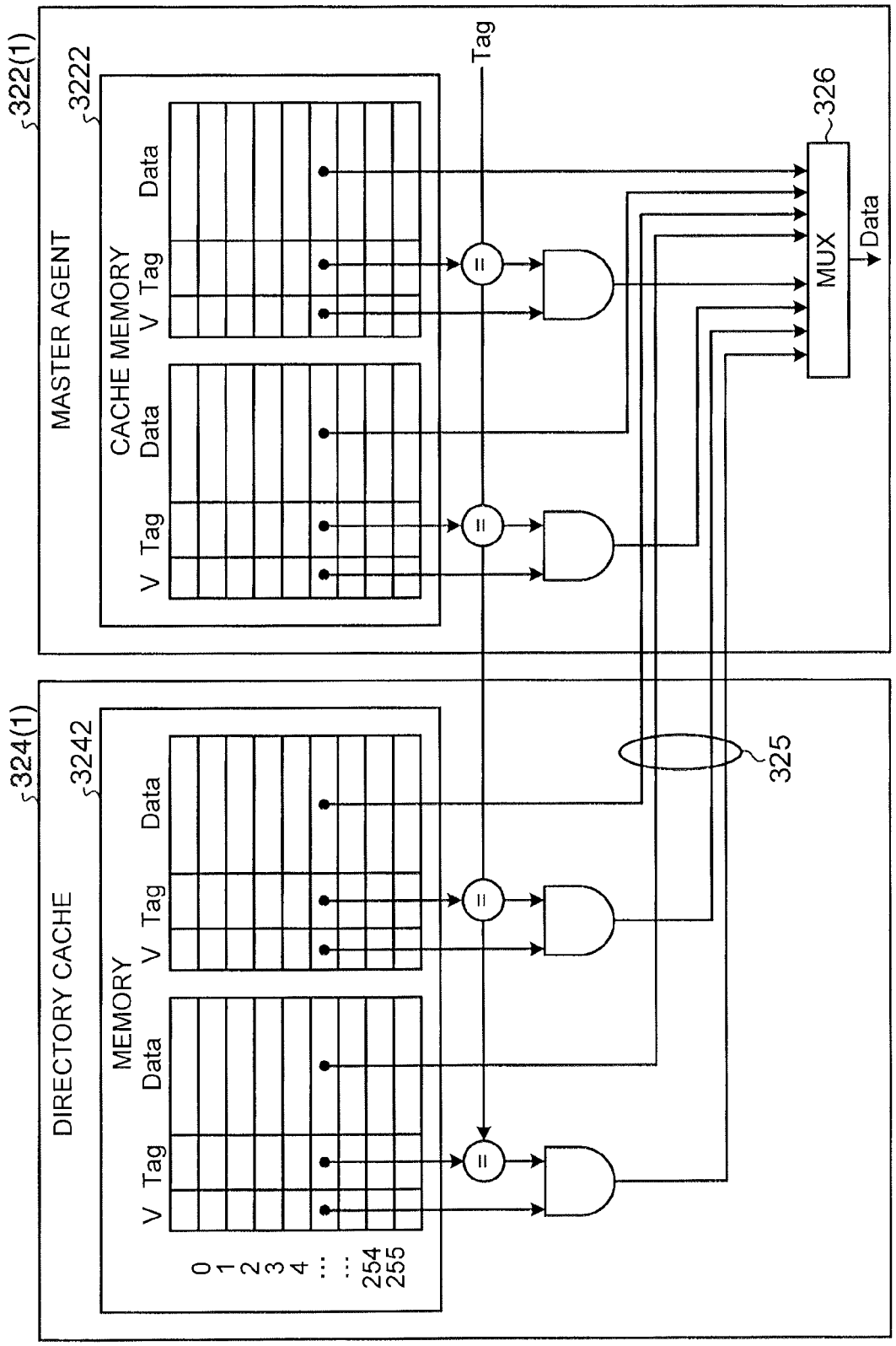
FIG. 13 is a diagram illustrating a connection example of caches in a master agent and a directory cache accordig to the fourth embodiment.

FIG. 13 is a diagram illustrating a connection example of caches in the master agent and the directory cache. The memory 3242 and the cache memory 3222 are used together in combination, and the control circuit 3221 performs control such that the memory 3242 is newly incorporated into a cache memory to which the control circuit 3221 refers to in every event of access to the shared memory 43. To this end, the wiring 325 is provided to allow the control circuit 3221 to perform read and write accesses to the memory 3242, and the cache memory 3222 and the memory 3242 each used as a 2-way set associative cache are combined into a 4-way set associative cache.

In this regard, the data field in the memory 3242 needs to be configured in advance to have the same number of bits as the data field in the cache memory 3222. In some cases, the data field in the memory 3242 needs to have redundant bits in addition to the number of bits required to implement the original functioi as the directory cache 324. Then, the number of effective entries is limited to the smaller number out of the numbers of entries in the two caches.

The control circuit 3221 performs write control to write back data cached in the cache memory 3222 to the shared memory 43 and to write data in the shared memory 43 to the cache memory 3222. Accordingly, the control circuit 3221 is configured inn advance such that the control circuit 3221 can perform the same write control on the memory 3242.

An outline of processing in the master agent 322(1) of the coherent bus 32B(1) thus configured is explained. When the switch circuits 22a, 22b switch the paths to the second paths 232, the coherent bus 32B(1) is used as a path for accesses (non-coherent accesses) to the non-coherent area 433 in the shared memory 43. In usual operations, in the coherent bus 32B(1) accesses to the shared memory 43 are-executed by the control circuit 3221 in the master agent 322. When the module Ai, Bi, C requests a non-coherent access to the shared memory 43, and if cache data is present in the cache memory 3222 or the memory 3242, the control circuit 3221 returns the data in the cache memory 3222 or the memory 3242 to the module Ai, Bi, C without accessing the shared memory 43. This reduces the latency of the access to the shared memory 43. On the other hand, if the cache data is not present in the cache memory 3222 and the memory 3242, the control circuit 3221 generates a command to access the non-coherent area 433 in the shared memory 43, and the slave agent 323 fetches data from the shared memory 43 according to the command.

In the fourth embodiment, when the switch circuits 22a, 22b select the second paths 232, the memory 3242 in the directory cache 324(1) of the coherent bus 32B(1) is used as the cache memory of the master agent 322(1) as described above. Thus, the coherent bus 32B(1), which is not used by the CPUs 21c, 21d to establish cache coherency, can be utilized anew as a non-coherent access path including data caches, thereby producing an effect of enhancing access efficiency.

Next, an application example of the above embodiments is described.

Figure 14:
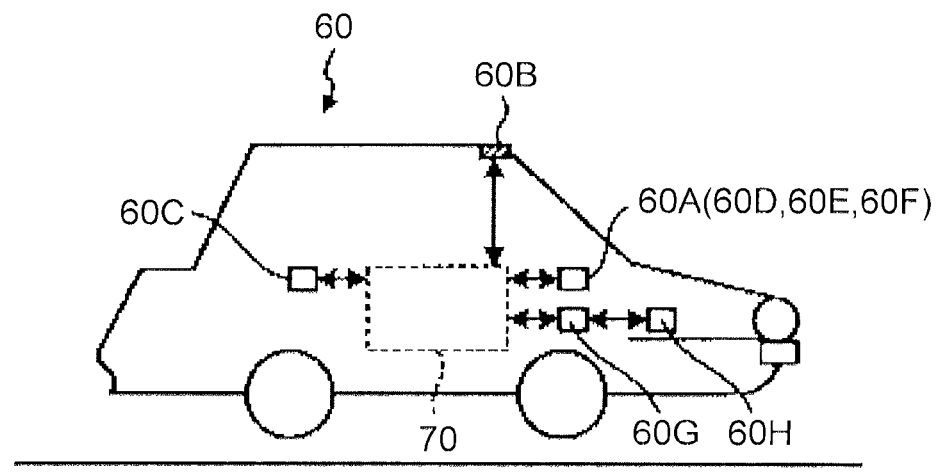
FIG. 14 is a diagram illustrating an example of a mobile object.

FIG. 14 is a diagram illustrating an example of a mobile object 60 according to the present embodiment.

The mobile object 60 includes an image processing LSI 70, an output unit 60A, a sensor 60B, an input device 60C, a power controller 60G, and a power unit 60H.

The mobile object 60 is, for example, a vehicle (motorcycle or automobile) a robot, a ship, an airplane, etc. The mobile object 60 is, for example, a mobile object capable of traveling (autonomous driving) without intervention of human driving operation, that is, for example, an autonomous car. The image processing LSI 70 is not limited to a type mounted on the mobile object 60. The image processing LSI 70 may be installed on a stationary object such as a guard rail, a pool, a traffic sign, etc.

Figure 15:
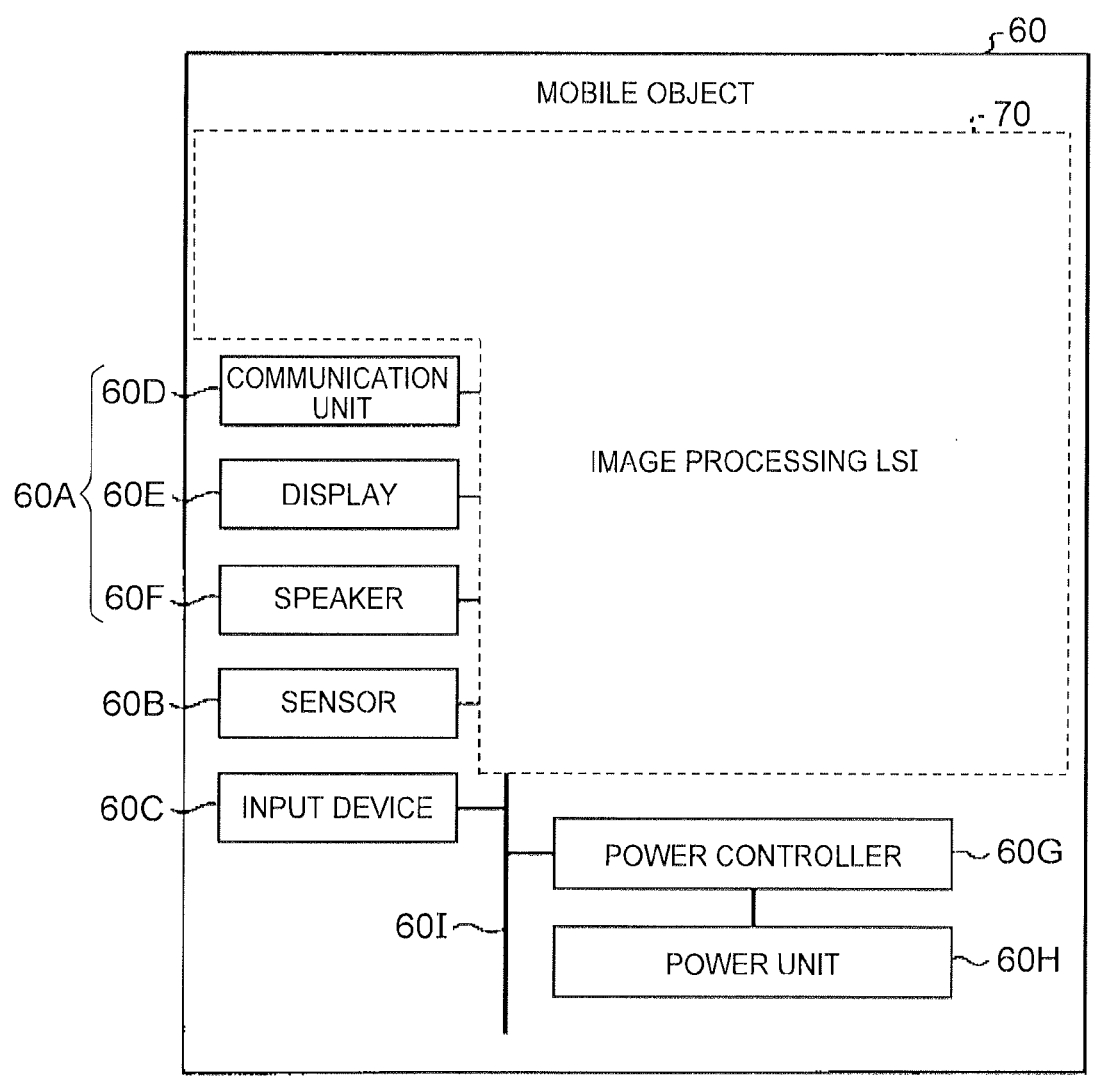
FIG. 15 is a block diagram illustrating an example of an electrical configuration of a mobile object.

FIG. 15 is a block diagram illustrating example of an electrical configuration of the mobile object 60.

The output unit 60A outputs various kinds of information. The output unit 60A includes, for example, a communication unit 60D, a display 60E, and a speaker 60F.

The communication unit 60D communicates with external apparatuses. The communication unit 60D transmits output information to the external apparatuses. In addition, the communication unit 60D receives road information and the like from the external apparatuses. The road information indicates a signal, a traffic sign, a surrounding building, a road width of each lane, the center line between lanes, and the like. The road information may be stored in an image processing chip or a memory provided in the mobile object.

The sensor 60B is a sensor that acquires a driving environment of the mobile object 60. The sensor 60B includes, for example, an external sensor and an internal sensor. The internal sensor monitors surveillance information such as an acceleration rate of the mobile object 60, a speed of the mobile object 60, and an angular speed of the mobile object 60, for example. The external sensor monitors surrounding information of the mobile object 60. The external sensor may be mounted on the mobile object 60 or may be installed outside the mobile object 60 (for example, on another mobile object, an external apparatus, or the like).

The surrounding information is information indicating surrounding conditions of the mobile object 60. The surrounding information is, for example, a captured image of the surroundings of the mobile object 60, distance information, and the like. Here, the surrounding information may include positional information of the mobile object 60. The external sensor is, for example, an image capture device that obtains captured images by shooting, a distance sensor (millimeter wave radar, laser sensor, or range image sensor), a position sensor (global navigation satellite system (GNSS) or global positioning System (GPS)), a wireless communication device, or the like. The captured image is in the form of digital image data in which a pixel value is specified for each pixel, a depth map in which a distance from the sensor 60B is specified for each pixel, or the like. The laser sensor is, for example, a two-dimensional laser imaging detection and ranging (LIDAR) sensor which is installed in parallel with a horizontal plane, or three-dimensional LIDAR sensor.

The input device 60C receives various instructions and information inputs from a user. The input device 60C is, for example, a pointing device such as a mouse or trackball, an input device such as a keyboard, or the like. Alternatively, the input device 60C may be an input function in a touch panel, the input function provided integrally with the display 60E.

The power controller 60G controls the power unit 60H. The power unit 60H is a device which is mounted on and drives the mobile object 60. The power unit 60H is, for example, an engine, a motor, wheels, or the like.

The power unit 60H performs driving under the control of the power controller 60G. For example, the power controller 60G controls an acceleration level, a braking level, a steering angle, and the like by judging the surrounding conditions based on the output information generated by the image processing LSI 70, the information obtained from the sensor 60B, and the like.

The image processing LSI 70, the output unit 60A, the sensor 60B, the input device 60C, and the power controller 60G are connected to each other via a bus 60I. The power unit 60H is connected to the power controller 60G.

Figure 16:
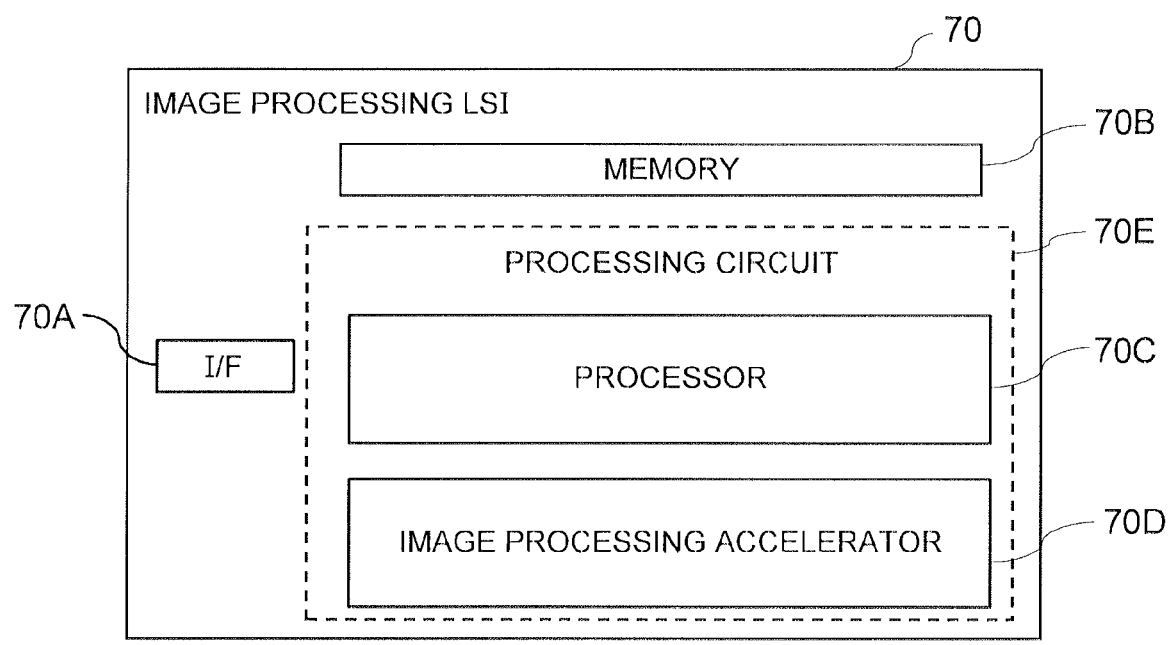
FIG. 16 is a block diagram illustrating an example of an image processing LSI.

FIG. 16 is a block diagram illustrating an example of the image processing LSI 70. The image processing LSI 70 includes an I/F 70A, a memory 70B, and a processor 70C. Here, the output unit 60A, the sensor 60B, the input device 60C, the power controller 60G, and the image processing LSI 70 are connected to each other via the bus 60I.

The I/F 70A is connected to a network (N/W) or the like with another system. In addition, the I/F 70A manages transmission and reception of information to and from the communication unit 60D. Information on a recognized object such as a person and information on a distance to the recognized object are outputted via the I/F 70A.

The memory 70B stores various kinds of data. The memory 70B is, for example, a random access memory (RAM), a ROM, or a semiconductor memory element such as a flash memory. The ROM holds necessary data and programs to be executed by the processor 70C. The RAM functions as a work area for the processor 70C. Here, the memory 70B may be provided outside the image processing LSI 70 or outside the mobile object 60.

Instead, the memory 70B may be a storage medium. Specifically, the storage medium may be a medium which stores or temporarily stores the programs and various kinds of information downloaded via a local area network (LAN) or the Internet.

Processing functions of the processor 70C are stored in the memory 70B in the form of programs executable by a computer. The processor 70C implements functions in accordance with each program by loading the program from the memory 70B and executing the program.

In the present embodiment, an image processing accelerator 70D is provided as a dedicated circuit, besides the processor 70C. A processing circuit 70E includes the processor 70C and the image processing accelerator 70D.

The processor 70C, the image processing accelerator 70D, the memory 70B, the I/F 70A, and a peripheral circuit (not illustrated) are connected to each other via a bus provided in the image processing LSI 70 but not illustrated.

Here, the image processing accelerator 70D May be incorporated into the processor 70C.

Various embodiments in FIGS. 2 to 13 may be applied in the internal design of the image processing LSI 70 described in reference to FIGS. 14 to 16.

Although the several embodiments are described hereinabove, these embodiments are provided merely as examples, and are not intended to limit the scope of the claims. These novel embodiments may be carried out in various different modes, and can be partly omitted, replaced, or altered in various manners without departing from the essence of the embodiments. These embodiments and modifications thereof are included in the scope and the essence of the claims, and also included in the range of the inventions specified in the claims and their equivalents.

What is claimed is:

1. A system LSI comprising:
a first group including a first CPU and a first module;
a second group including a second CPU and a second module having a same configuration as the first module; and
a shared memory including a first area for which cache coherency is maintained by an access from the first group, and a second area for which cache coherency is maintained by an access from the second group, the shared memory electrically is connected to the first group and the second group, wherein
the first group includes a first bus through which cache coherency is maintained between the first CPU and the first module, and a second bus which electrically connects the first bus and the first module to each other, and
the second group includes a third bus through which cache coherency is maintained between the second CPU and the second module, and a fourth bus which electrically connects the third bus and the second module to each other,
wherein
the second bus and the fourth bus are electrically connected to each other,
wherein
the second CPU includes:
a first path electrically connected to the first bus;
a second path electrically connected to the third bus; and
a switch circuit which switches between the first path and the second path,
wherein
the first bus includes:
a master agent which controls an access to the shared memory via the third bus, and
a directory cache which monitors a data flow through the first bus,
the directory cache includes:
a first control circuit; and
a memory which stores a monitoring result of the data flow,
the master agent includes:
a second control circuit;
a cache memory; and
a third path which electrically connects the second control circuit and the memory of the directory cache to each other, and
when the switch circuit selects the second path, the second control circuit uses, as a cache, the memory via the third path in addition to the cache memory.

2. The system LSI according to claim 1, wherein the first CPU includes a plurality of CPUs and the second CPU includes a plurality of CPUs.

3. The system LSI according to claim 1, wherein each of the first CPU and the second CPU is a CPU core or a CPU cluster including a plurality of CPU cores among which cache coherency is established.

4. The system LSI according to claim 1, wherein the first group includes a third module which is not provided to the second group.

5. A system LSI comprising:
a first group including a first CPU and a first module;
a second group including a second CPU and a second module having a same configuration as the first module; and
a shared memory including a first area for which cache coherency is maintained by an access from the first group, and a second area for which cache coherency is maintained by an access from the second group, the shared memory electrically connected to the first group and the second group, wherein
the first group includes a first bus through which cache coherency is maintained between the first CPU and the first module, and a second bus which electrically connects the first bus and the first module to each other, and
the second group includes a third bus through which cache coherency is maintained between the second CPU and the second module, and a fourth bus which electrically connects the third bus and the second module to each other,
wherein
the second bus and the fourth bus are not electrically connected to each other,
wherein
the second bus includes a first protector circuit at a connection point of the second bus to the first module,
the fourth bus includes a second protector circuit at a connection point of the fourth bus to the second module,
the first protector circuit passes an access request from the first module to the first bus if the access request is to the first area in the shared memory, and returns an error if the access request is to the second area, and
the second protector circuit passes an access request from the second module to the third bus if the access request is to the second area in the shared memory, and returns an error if the access request is to the first area.

6. A system LSI comprising:
a first group including a first CPU and a first module;
a second group including a second CPU and a second module having a same configuration as the first module; and
a shared memory including a first area for which cache coherency is maintained by an access from the first group, and a second area for which cache coherency is maintained by an access from the second group, the shared memory is electrically connected to the first group and the second group, wherein
the first group includes a first bus through which cache coherency is maintained between the first CPU and the first module, and a second bus which electrically connects the first bus and the first module to each other, and
the second group includes a third bus through which cache coherency is maintained between the second CPU and the second module, and a fourth bus which electrically connects the third bus and the second module to each other,
wherein
the second bus includes a first protector circuit at a connection point of the second bus to the first module,
the fourth bus includes a second protector circuit at a connection point of the fourth bus to the second module, and
the first protector circuit and the second protector circuit are set such that an area inaccessible by the first module and an area inaccessible by the second module do not overlap each other.

7. A system LSI comprising:
a first group including a first CPU and a first module;
a second group including a second CPU and a second module having a same configuration as the first module; and
a shared memory including a first area for which cache coherency is maintained by an access from the first group, and a second area for which cache coherency is maintained by an access from the second group, the shared memory is electrically connected to the first group and the second group, wherein
 the first group includes a first bus through which cache coherency is maintained between the first CPU and the first module, and a second bus which electrically connects the first bus and the first module to each other, and
 the second group includes a third bus through which cache coherency is maintained between the second CPU and the second module, and a fourth bus which electrically connects the third bus and the second module to each other,
the system LSI further comprising:
 a third group including a third CPU and a fourth module having a same configuration as the first module has, wherein
 the shared memory is electrically connected to the third group, and further includes a third area for which cache coherency is maintained by an access from the third group, and
 the third group includes a fifth bus through which cache coherency is maintained between the third CPU and the fourth module, and a sixth bus which electrically connects the fifth bus and the fourth module to each other.

8. A fault detection method for a system LSI, the system LSI including:
a first group including a first CPU and a first module;
a second group including a second CPU and a second module having a same configuration as the first module; and
a shared memory including a first area for which cache coherency is maintained by accesses from the first group, and a second area for which cache coherency is maintained by accesses from the second group, the shared memory is electrically connected to the first group and the second group,
the first group including a first bus through which cache coherency is maintained between the first CPU and the first module, and a second bus which electrically connects the first bus and the first module to each other,
the second group including a third bus through which cache coherency is maintained between the second CPU and the second module, and a fourth bus which electrically connects the third bus and the second module to each other,
the method comprising:
 causing the first group to execute a first program that includes execution by the first module;
 causing the second group to execute a second program that includes execution by the second module and is same as the first program;
 acquiring a first execution result of the first program and a second execution result of the second program; and
 determining whether or not a fault occurs in the system LSI based on the first execution result and the second execution result,
wherein
 the system LSI further includes a third group including a third CPU and a third module having same configuration as the first module has,
 the shared memory is electrically connected to the third group, and further includes a third area for which cache coherency is maintained by an access from the third group,
 the third group includes a fifth bus through which cache coherency is maintained between the third CPU and the third module, and a sixth bus which electrically connects the fifth bus and the third module to each other,
 the method further comprises causing the third group to execute a third program that includes execution by the third module and is same as the first program,
 the acquiring process further includes acquiring a third execution result of the third program, and
 the determining process includes determining whether or not a fault occurs in the system LSI based on the first execution result, the second execution result, and the third execution result.

9. The fault detection method for a system LSI according to claim 8, wherein the determining process includes deteirmining that the system LSI is normal if the first execution result and the second execution result are same.

10. The fault detection method for a system LSI according to claim 8, wherein the determining process includes determining that a fault occurs in the system LSI if the first execution result and the second execution result are different from each other.

11. The fault detection method for a system LSI according to claim 8, wherein the determining process includes, if any one of the first, second, and third execution results is different from the other two execution results, determining that a fault occurs in the group having obtained the different execution result.

* * * * *